United States Patent
Yamamoto

(10) Patent No.: US 8,692,923 B2
(45) Date of Patent: Apr. 8, 2014

(54) DIGITAL CAMERA

(75) Inventor: Yasuhiro Yamamoto, Tokyo (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 254 days.

(21) Appl. No.: 13/252,520

(22) Filed: Oct. 4, 2011

(65) Prior Publication Data

US 2012/0086818 A1    Apr. 12, 2012

(30) Foreign Application Priority Data

Oct. 7, 2010   (JP) .................................. 2010-227388

(51) Int. Cl.
    *H04N 5/222*    (2006.01)
(52) U.S. Cl.
    USPC .................................................... 348/333.07
(58) Field of Classification Search
    USPC .................................................... 348/333.07
    See application file for complete search history.

(56) References Cited

U.S. PATENT DOCUMENTS

| | | | |
|---|---|---|---|
| 6,262,767 B1 | 7/2001 | Wakui | |
| 8,036,469 B2 * | 10/2011 | Shiomi | 348/211.2 |
| 2002/0005907 A1 * | 1/2002 | Alten | 348/333.07 |
| 2003/0179306 A1 * | 9/2003 | Lee | 348/333.07 |
| 2003/0193600 A1 * | 10/2003 | Kitamura et al. | 348/333.01 |
| 2004/0189850 A1 * | 9/2004 | Chang | 348/333.07 |
| 2005/0046727 A1 * | 3/2005 | Nozaki et al. | 348/333.07 |
| 2005/0122416 A1 * | 6/2005 | Ryu et al. | 348/333.07 |
| 2007/0147815 A1 * | 6/2007 | Tanaka | 348/207.1 |
| 2009/0073269 A1 * | 3/2009 | Yoshida et al. | 348/207.1 |

FOREIGN PATENT DOCUMENTS

| | | |
|---|---|---|
| JP | 10-010615 | 1/1998 |
| JP | 2000-261697 | 9/2000 |

OTHER PUBLICATIONS

U.S. Appl. No. 13/252,486 to Yasuhiro Yamamoto, filed Oct. 4, 2011.
U.S. Appl. No. 13/252,508 to Yasuhiro Yamamoto, filed Oct. 4, 2011.

* cited by examiner

*Primary Examiner* — Sinh Tran
*Assistant Examiner* — Jason Flohre
(74) *Attorney, Agent, or Firm* — Greenblum & Bernstein, P.L.C.

(57) ABSTRACT

A digital camera is provided that includes a first wireless communication module and image data processor. The first wireless communication module transmits image data to a monitor device via wireless communication. The image data processor processes image data before transmitting it to the monitor device via the wireless communication module. The image data processor has a first mode in which the image data are compressed at a predetermined compression ratio when transmitting a through-the-lens image to the monitor device, and a second mode in which the image data are compressed less than the predetermined compression, including zero compression, while carrying out at least one of reducing a frame rate compared to the first mode or extracting part of an image comprising the image data.

8 Claims, 3 Drawing Sheets

DIGITAL CAMERA

BACKGROUND OF THE INVENTION

1. Field of the Invention

The present invention relates to a digital camera that is able to represent a through-the-lens image.

2. Description of the Related Art

In general, digital cameras are provided with a monitor that is used to display a captured image or a through-the-lens image (a live preview image). In certain such cameras a monitor is configured to be rotatable with respect to the camera body via a rotating mechanism, such as a hinge. Further, a digital camera with a monitor being made detachable from the camera body is also provided in Japanese Unexamined Patent Publication No. 2000-261697.

SUMMARY OF THE INVENTION

It is advantageous if the digital camera disclosed in the above patent document can display a through-the-lens image on the monitor even when the monitor is detached from the camera body. However, the wireless band assigned to such data transmission does not have a sufficient data transfer rate to transmit the above-mentioned moving image, thus representation of the moving image on the monitor device in such a situation is restricted. To resolve this problem, the image data may be compressed prior to data transmission via wireless communication. However, this method is not preferable in focusing image verification because compression artifacts, such as blockiness, mosquito noise and the like, emerge when lossy compression is decoded. For example, a user may not be able to verify whether or not a lens system is properly focused on a subject when using an autofocus (AF) operation of the camera.

One aspect of the present invention is to provide a digital camera that transmits image data from a camera body to a monitor device via a communication method that is adapted to the purpose of data use.

According to the present invention, a digital camera is configured with a first wireless communication module and image data processor.

The first wireless communication module transmits image data to a monitor device via wireless communication. The image data processor processes the image data before transmitting it to the monitor device via the wireless communication module. The image data processor has a first mode in which the image data are compressed at a predetermined compression ratio when transmitting a through-the-lens image to the monitor device, and a second mode in which the image data are compressed less than the level indicated by the predetermined compression ratio, including zero compression, while carrying out at least one of reducing a frame rate compared to the first mode or extracting part of an image comprising the image data.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
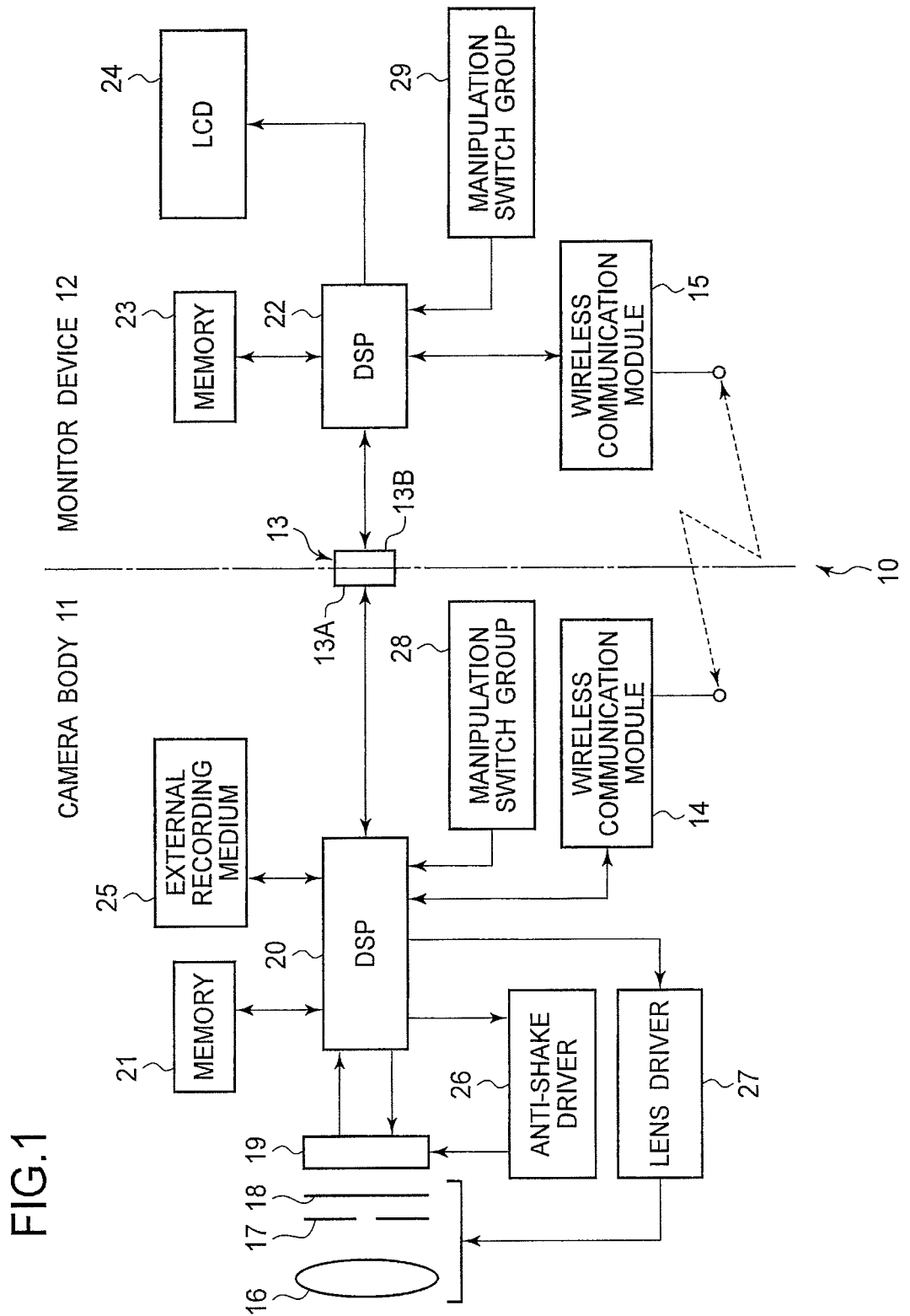
FIG. 1 is a block diagram schematically illustrating the general structure of a digital camera of an embodiment of the present invention.

The present invention is described below with reference to the embodiments shown in the drawings.

FIG. 1 is a block diagram schematically illustrating the general structure of a digital camera to which an embodiment of the present invention is applied.

The digital camera 10 includes a camera body 11 and a monitor device 12. The monitor device is configured to be detachable from the camera body 11. When the monitor device 12 is attached to the camera body 11, the camera body 11 and the monitor device 12 are electrically connected to each other via a connector 13, which is comprised of a pair of connector halves 13A and 13B. Namely, moving image data of a through-the-lens image, image data of a still image or control signals are transmitted/received between the camera body 11 and the monitor device 12 via the connector 13. On the other hand, when the monitor device 12 is detached from the camera body 11, the above-mentioned data and signals are transmitted/received through wireless communications by wireless communication modules 14 and 15 provided on each side of the camera body 11 and monitor device 12.

In the camera body 11, an image sensor 19 captures an object image through a lens system 16, an aperture 17 and a shutter 18. The image captured by the image sensor 19 is fed to a digital signal processor (DSP) 20 where predetermined image processing is performed. Further, the image data is temporarily stored in memory 21 and also fed to a digital signal processor (DSP) 22 of the monitor device via the connector 13 or the wireless communication modules 14 and 15. The image data received by the digital signal processor (DSP) 22 is stored in memory 23 of the monitor device 12. At the same time, the received image may also be displayed on an LCD or monitor 24 of the monitor device 12. Note that the image stored in the memory 21 can also be recorded onto an external recording medium 25, such as a memory card or the like, if desired.

Further, the camera body 11 of the present embodiment is configured with an anti-shake mechanism, which is driven by an anti-shake driver 26, to provide shake reduction or image stabilization functionality. In the example of FIG. 1, a sensor-shift type is chosen as the anti-shake mechanism, however, a lens-based type or any other type of image stabilization system or module may also be applied.

In the present embodiment, the optical system including the lens system 16, aperture 17, shutter 18 and so on, is controlled by a lens driver 27. Further, the anti-shake driver 26 and the lens driver 27 are controlled by the digital signal processor 20. Incidentally, an autofocus (AF) operation of the present embodiment may be carried out by the digital signal processor (DSP) 20 by measuring the contrast between images captured by the image sensor 19, and driving the lens system 16, accordingly.

Further, manipulation switch groups 28 and 29 provided on each of the camera body 11 and the monitor device 12 are connected to the digital signal processors (DSPs) and 22, respectively. Each of the digital signal processors (DSPs) 20 and 22 performs various types of processes based on the manipulation of switches in the manipulation switch groups 28 and 29. Note that instead of, or in addition to, the manipulation switch group 29, a touchscreen may be applied to the LCD 24.

Figure 2:
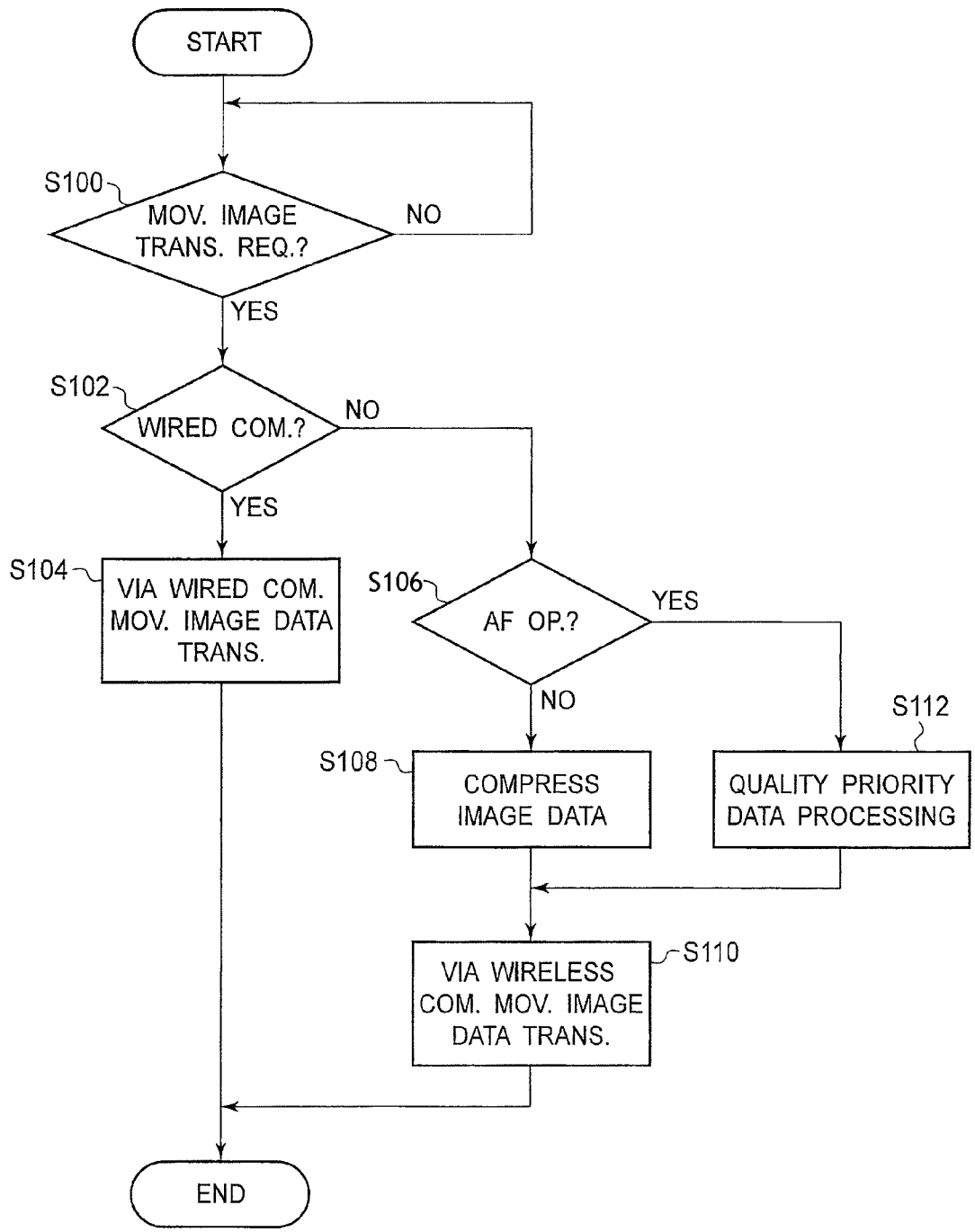
FIG. 2 is a flowchart of an image data transmission operation.

With reference to the flowchart of FIG. 2, a moving-image data transmission operation carried out in the digital camera 10 of the present embodiment will be explained. Note that the moving-image data transmission operation of FIG. 2 is repeatedly carried out by the digital signal processor (DSP) 20 of the camera body 11 at a predetermined time interval.

Recently, the number of pixels on the image sensors of digital cameras has been increasing. The resolution of a through-the-lens image (a live preview image) obtained by the image sensor 19 of the digital camera 10 may employ the VGA computer display standard (640*480 pixels). However, since the frequency band for the radio communication (wireless communication) is limited, the data transfer rate is also limited. For example, an effective data transfer rate for a wireless local network employing IEEE802.11n standards is below 3 MB/s while VGA images of 30 fps requires 9.2 MB/s. Consequently, in the present embodiment the image data is compressed to a level in which the effective data transfer rate is below 3 MB/s at 30 fps when through-the-lens images are transferred via wireless communication.

However, when data are lossy compressed, a decoded image includes compression artifacts, such as blockiness, mosquito noise and the like, which cause the image quality to deteriorate. The compression artifacts become prominent as the compression level increases. When through-the-lens images are merely viewed for checking the composition of the frame, the image quality effects caused by the lossy compression of image data do not cause a problem. However, when verifying focusing conditions of an image, blockiness and/or mosquito noise in a decoded image impede the verification because details of the image must be inspected.

Accordingly, in the image data transmission portion of the autofocus (AF) operation of the present embodiment, priority is given to image quality that is dissimilar to the case when the normal through-the-lens image or preview image data are transferred.

In Step S100, whether or not the moving-image data transmission has been requested is determined. When it is determined that the data transmission has been requested, whether or not the monitor device (the LCD unit) 12 is attached to the camera body 11 is determined in Step S102. Namely, whether the data transmission will be carried out via the wired communication or the wireless communication is determined. Incidentally, the method for detecting the attachment of the monitor device 12 to the camera body 11 will be detailed later with reference to FIG. 3.

When the monitor device 12 is attached to the camera body 11 and thus it is determined in Step S102 that the data transmission will be carried out via wired communication, in Step S104 the data of the images being captured by the image sensor are transferred to the monitor device 12 via wires connected through the connector 13 until this moving-image data transmission operation terminates. In this situation, for example, VGA images are transferred from the digital signal processor (DSP) 20 of the camera body 11 at 30 fps via the wires to the digital signal processor (DSP) 22 of the monitor device 12 to be displayed on the LCD 24.

On the other hand, when the monitor device 12 is detached from the camera body 11 and thus it is determined that the data transmission will be carried out by radio communication in Step S102, whether or not the autofocus operation (AF) is underway is determined in Step S106. When the autofocus operation (AF) is inactive, the moving-image data obtained by the image sensor 19 are subjected to predetermined data compression at a predetermined data compression ratio in Step S108 (a normal mode). Further, the moving-image data compressed in Step S110 are transmitted to the monitor device 12 via wireless communication using modules 14 and 15, accordingly. Thereby, this moving-image data transmission operation terminates.

On the other hand, when it is determined in Step 106 that the autofocus operation (AF) is being executed, data processing particular to the autofocus operation (referred to as quality priority data processing) is carried out using the moving-image data obtained by the image sensor 19 in Step S112 (an image-quality priority mode). Further, the moving-image data compressed in Step S110 are transmitted to the monitor device 12 via wireless communication using the wireless modules 14 and 15, accordingly. Thereby, this moving-image data transmission operation terminates. Note that the autofocus (AF) operation may be repeated while the release button (not shown) is depressed halfway and the release switch (not shown) is maintained ON state.

Here, the quality priority data processing performed during the autofocus (AF) operation places priority on the image quality, at least for an area (a target area) used in the autofocus (AF) operation. In this data processing procedure, the data compression level may be reduced from the amount indicated by the above-predetermined ratio for the normal mode; the frame rate may be reduced instead of compressing the moving-image data; a partial image around the AF area may be extracted from the original image; or any combination of these methods may be employed. Namely, the quality priority data processing procedure in the autofocus operation of the present embodiment suppresses the data transfer rate to a rate that is available in the assigned wireless band (e.g., 3 MB/s or below) while reducing the amount of data compression (in mathematical terms increasing the data compression ratio, which is defined as compressed size/uncompressed size) including zero compression.

Figure 3:
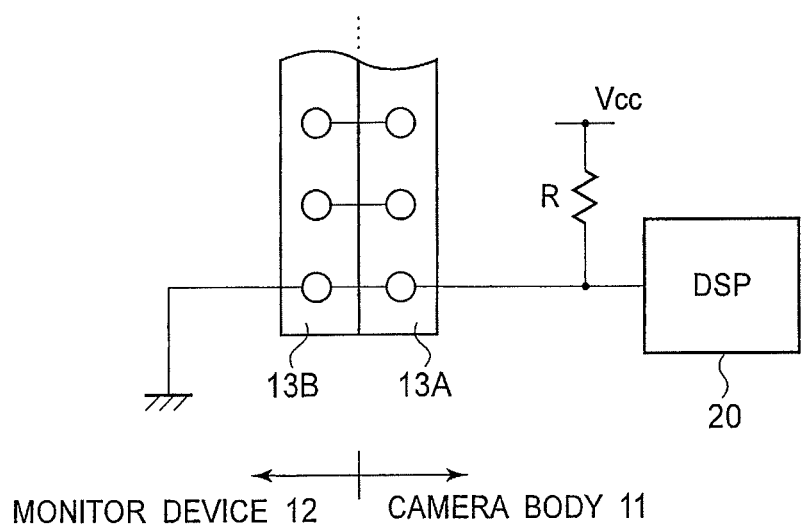
FIG. 3 is a connection diagram of connector terminals of the present embodiment.

FIG. 3 schematically shows the connection of terminals in the connector 13, which is used for detection of the attachment status of the monitor device 12. Although there are a number of terminals provided in the connector 13, only three of them are described in FIG. 3 in this example. In FIG. 3, the connector half 13B of the monitor device 12 is connected to the connector half 13A of the camera body 11.

FIG. 3 schematically shows the connection of terminals in the connector 13, which is used for detection of the monitor device 12's attachment. Although there are a number of terminals provided to the connector 13, only three of them are described in FIG. 3 as an example. In FIG. 3, the connector half 13B of the monitor device 12 is connected to the connector half 13A of the camera body 11.

A terminal of the connector half 13B that is used to detect the attachment of the monitor device 12 to the camera body 11 is connected to the ground while the voltage of the complementary terminal of the connector half 13A of the camera body 11 is pulled up via a pull-up resistor R connected to a terminal of the digital signal processor (DSP) 20 that is assigned to the above detection. Namely, when the monitor device 12 is detached from the camera body 11 and the connector halves 13A and 13B are disconnected, the voltage of the detection terminal of the digital signal processor (DSP) 20 is kept high. On the other hand, when the monitor device 12 is attached to the camera body 11 and the connector halves 13A and 13B are connected, the detection terminal of the digital signal processor (DSP) 20 is connected to the ground and the voltage level of the detection terminal is changed to low. Namely, the digital signal processor (DSP) 20 determines the attachment status of the monitor device 12 by determining whether the voltage of the detection terminal is high or low.

As described above, according to the present embodiment, in which the digital camera with the detachable monitor device, the moving image data can be transferred from the camera body to the monitor device even when the monitor device is detached from the camera body. Further, in the present embodiment, image data can be transferred from the camera body to the monitor device in a suitable format in accordance to particular situations. Namely, in the transmission of moving-image data via wireless communication, through-the-lens images are compressed at a predetermined data compression ratio prior to the data transmission in the normal mode, while the image data are transmitted under a reduced compression level or without compression in the image quality priority mode during the autofocus (AF) operation. Thereby, an image displayed on the monitor is accommodated to the situations that correspond to either of the framing situation or the auto-focusing situation by modifying the above data transmission conditions.

Further, although the monitor device in the present embodiment is detachable from the camera body, the present invention may also be applied to a system that transmits moving image data by wireless communication (e.g. radio communication) from a digital camera to a monitor or display device that may also be used independently from the digital camera configured with radio communication ability and an integrated monitor. In such case the digital camera may be provided with a monitor integrated with the camera body, and the transmission of the moving image data via radio communication to the remote monitor device may be chosen by a user selecting such mode. Further, during the wireless communication, the image data are subjected to a similar process as described in Step S106-S112 of FIG. 2 and then transferred to the monitor device.

Further, in the present embodiment the quality priority data processing procedure is carried out continuously during the autofocus operation using the moving-image data, and the processed data is transferred accordingly via wireless communication to the monitor device. However, only the image data obtained upon completion of an autofocus operation may be subjected to the quality priority data processing and transferred via wireless communication, while images obtained during the autofocus operation must be compressed in the same way as the through-the-lens image (or in the normal mode) before the data is transmitted via the wireless communication.

Furthermore, in the present embodiment, the autofocus (AF) operation is adopted as an example to explain the invention. However, similar data transmission may also be performed during an auto exposure (AE) operation.

Although the embodiment of the present invention has been described herein with reference to the accompanying drawings, obviously many modifications and changes may be made by those skilled in this art without departing from the scope of the invention.

The present disclosure relates to subject matter contained in Japanese Patent Application No. 2010-227388 (filed on Oct. 7, 2010), which is expressly incorporated herein, by reference, in its entirety.

The invention claimed is:

1. A digital camera, comprising:
   a first wireless communication module that transmits image data to a monitor device via wireless communication;
   an image data processor that processes image data before transmitting said image data to said monitor device by said wireless communication module; and
   said image data processor comprising a first mode in which said image data is compressed at a predetermined compression level when transmitting a through-the-lens image to said monitor device; and a second mode in which an autofocus operation is performed, and in which said image data is compressed less than said predetermined compression level, including zero compression, while reducing a frame rate compared to said first mode and extracting a partial image around an autofocusing area from said image data.

2. The digital camera as in claim 1, further comprising a determiner that determines whether to perform said wireless communication or not.

3. The digital camera as in claim 2, wherein it is determined whether the autofocus operation is underway, and the second mode is performed when it is determined that the autofocus operation is underway.

4. The digital camera as in claim 2, wherein said second mode is undertaken at a completion of said autofocus operation.

5. The digital camera as in claim 2, further comprising:
   a camera body including an imaging module, a first connector half, said first wireless communication module and said image data processor; and
   said monitor device including a monitor, a second connector half connectable to said first connector half, and a second wireless communication module capable of communicating with said first wireless communication module; and said monitor device being attachable to and detachable from said camera body; and
   said image data is transmitted from said camera body to said monitor device through said first and second connector halves via wired communication when said first and second connector halves are connected, otherwise said image data is transmitted from said camera body to said monitor device via said wireless communication using said first and second wireless communication modules.

6. The digital camera as in claim 4, wherein said determiner determines whether to perform said wireless communication or not by detecting a connection between said first and second connector halves.

7. The digital camera as in claim 5, wherein said compression of said image data is not performed when said wired communication take place.

8. The digital camera as in claim 3, wherein the first mode is performed when it is determined that the autofocus operation is not underway.

* * * * *